United States Patent [19]

Pruett et al.

[11] Patent Number: 4,771,101
[45] Date of Patent: Sep. 13, 1988

[54] UNSATURATED POLYESTERS COLORED WITH LIGNIN

[75] Inventors: Wayne P. Pruett; John A. Hyatt, both of Kingsport; Samuel D. Hilbert, Jonesborough, all of Tenn.

[73] Assignee: Eastman Kodak Company, Rochester, N.Y.

[21] Appl. No.: 64,637

[22] Filed: Jun. 22, 1987

[51] Int. Cl.$^4$ .................... C08H 5/02; C08G 63/52
[52] U.S. Cl. ............................... 525/10; 523/510; 523/511; 527/400
[58] Field of Search ............... 523/510, 511; 527/400; 525/10

[56] References Cited

U.S. PATENT DOCUMENTS

| | | | |
|---|---|---|---|
| 2,209,289 | 7/1940 | Wallace | 527/400 |
| 3,503,762 | 3/1970 | Remer | 527/400 X |
| 4,102,944 | 7/1978 | Fukuyama et al. | 525/10 |
| 4,279,788 | 7/1981 | Lambuth | 524/72 |

Primary Examiner—Earl Nielsen
Attorney, Agent, or Firm—John F. Stevens; William P. Heath, Jr.

[57] ABSTRACT

Colored unsaturated polyesters having copolymerized therein lignin and lignin derivatives which condense during polymerization into the polyester chain are disclosed. The lignin moieties are thermally stable at the polymer processing temperature and are nonextractable from the polymer making these colored polyesters suitable for use in bathroom fixtures, boats, certain automotive applications and the like.

29 Claims, No Drawings

UNSATURATED POLYESTERS COLORED WITH LIGNIN

FIELD OF THE INVENTION

The invention relates to colored unsaturated polyesters which have copolymerized therein lignin and lignin derivatives. The invention also relates to crosslinked colored polyester thermosetting composition prepared from these colored unsaturated polyesters.

BACKGROUND OF THE INVENTION

Unsaturated polyester compositions are useful in the manufacture of shaped articles such as bathroom fixtures, boats, automotive parts and the like. In most of these applications it is necessary to color the polyester compositions by incorporating a color-imparting amount of a material that imparts color to the polyester compositions. A typical polyester colorant is disclosed in U.S. Pat. Nos. 4,250,078 (McFarlane et al.) and 4,420,581 (McFarlane et al.). These patents disclose the use of iron oxides to impart color to polyester compositions. The iron oxides may be used in combination with certain anthraquinone dyes which are copolymerized into the polyester compositions. While the coloring of polyester with iron oxide or iron oxide/dye combinations has been effective it is not without its shortcomings. First of all, the production of colored polyester using anthraquinone dyes as colorants is quite costly. Secondly, the iron oxide colorants have a tendency to cloud the polyester compositions. Clouding is often undesirable since many of these polyester compositions are used in applications wherein the polyester must be clear enough not to obstruct vision. Lastly, iron oxide colorants have a tendency to be unevenly distributed throughout the polyester compositions thereby resulting in non-uniform coloring of the polyester. This non-uniformity results from the difficulty in evenly distributing the iron oxide colorants during the bleeding step that usually precedes molding or casting operations.

Accordingly, it is the primary object of the present invention to provide an alternative colorant for use in polyester compositions.

It is a further object of the present invention to provide an inexpensive colorant for polyester compositions which enables production of colored polyesters of greater clarity than previously available.

It is a still further object of the present invention to provide a colorant which may be added during the polymerization of the polyesters to thereby eliminate the colorant blending step and also achieve greater color uniformity in the polyester.

These and other objects of the present invention will be apparent to one of ordinary skill in the art from the summary and detailed description which follow.

SUMMARY OF THE INVENTION

The invention relates to a crosslinked colored polyester composition having an inherent viscosity of about 0.1 to about 0.3 comprising an unsaturated polyester having chemically linked into the polyester backbone a color-imparting amount of a compound selected from lignin and a lignin compound having functional groups chemically linkable with the polyester backbone, and a polymerizable ethylenically unsaturated crosslinking agent crosslinked with the unsaturated polyester in an amount such that the ratio of unsaturated polyester to crosslinking agent is greater than 0.1 and less than 9.0.

The invention also relates to a colored unsaturated polyester comprising an acid moiety selected from the group consisting of unsaturated polycarboxylic acids and anhydrides of unsaturated polycarboxylic acids, at least one polyhydric alcohol present in an amount sufficient to polymerize with the acid moiety and a color-imparting amount of a compound selected from lignin and lignin derivatives which are chemically linkable into the polyester backbone.

The invention also relates to a process for preparing a colored polyester having an inherent viscosity of about 0.1 to about 0.3 comprising the steps of polymerizing at least one alcohol with at least one compound selected from unsaturated polycarboxylic acids and anhydrides of unsaturated polycarboxylic acids, and with a color-imparting amount of a compound selected from lignin and lignin compounds which can be chemically linked in a polyester backbone.

The invention also relates to an article of manufacture comprising a crosslinked colored polyester composition which includes an unsaturated polyester having chemically linked into the polyester backbone a color-imparting amount of a compound selected from lignin and a lignin compound having functional groups chemically linkable with the polyester backbone, and a polymerizable ethylenically unsaturated crosslinking agent crosslinked with the unsaturated polyester in an amount such that the ratio of unsaturated polyester to crosslinking agent is greater than 0.1 and less than 9.0.

DETAILED DESCRIPTION OF THE PREFERRED EMBODIMENTS

The amber colored unsaturated polyesters of the invention have lignin and/or lignin derivatives copolymerized therein. These lignin and lignin derivatives condense during polymerization into the polyester backbone. Lignin itself polymerizes into the polyester backbone via reaction of the aliphatic hydroxyls with an unsaturated dicarboxylic acid used as a reactant during polyester formation. These lignin colorants are thermally stable at the polymer polycondensation temperature up to about 230° C. for a period of up to 20 hours. The lignin colorants are also stable during curing with crosslinking monomers at temperatures up to about 160° C. and higher. The lignin used in the present invention may be Kraft lignin, steam explosion lignin, acid hydrolysis lignin, organosolv lignin and the like. The lignin is produced commercially by pulping processes which are well known in the literature.

Among the lignin acetate, lignin propionate, lignin butyrate, lignin ethyl ether, lignin methyl ether, carboxymethyl lignin, (hydroxyethoxy) lignin, (hydroxypropoxy) lignin, and the like. The acetate, propionate and butyrate ester lignin derivatives can be fully oxygen-acylated and still be incorporated into the polyester by ester interchange processes. The lignin methyl and ethyl ethers are prepared under conditions leading to etherification of lignin phenolic hydroxyls only, leaving the aliphatic hydroxyls free to react during the polycondensation reaction employed to synthesize the amber colored polyesters. The preparation of such lignin derivatives is detailed in "Sarkanen and Ludwig," *Lignins: Occurrence, Formation, Structure, and Reactions*, Wiley-Interscience, New York, 1971, which is hereby incorporated by reference.

The useful unsaturated polyesters of this invention are the polyesterification products of one or more unsaturated dicarboxylic acids or their anhydrides and one or more dihydric alcohols. The term "polyester resin" is used herein to define the unsaturated polyester dissolved in or crosslinked with an ethylenically unsaturated monomer such as styrene.

Among the alpha, beta-ethylenically unsaturated polycarboxylic acids that may be used are those having 2-12 carbon atoms, e.g., maleic fumaric, substituted fumaric, citraconic, mesaconic, teraconic, glutaconic, muconic, and the like as well as mixtures thereof. Noncrosslinkable polycarboxylic acids, i.e., those which do not contain polymerizable alpha, beta-ethylenic unsaturation, may also be used if employed in combination with one or more of the aforementioned alpha, beta-ethylenically unsaturated polycarboxylic acids. Where such noncrosslinkable polycarboxylic acids are employed, the amount thereof should not constitute more than about 80% of the total equivalents of carboxyl groups in the esterification mixture. Preferably, such noncrosslinkable polycarboxylic acids will be employed in amounts varying between about 35% and 75% of the above indicated equivalence basis. Among the noncrosslinkable polycarboxylic acids that may be used are such as oxalic, malonic, succinic, glutaric, sebacic, adipic, phthalic, isophthalic, terephthalic, substituted phthalic, such as tetrachlorophthalic, suberic, azelaic, tricarballylic, citric, tartaric, cyclopropanedicarboxylic, cyclohexanedicarboxylic, and the like, as well as mixtures thereof.

With respect to the saturated aliphatic polyhydric alcohols which may be employed in the preparation of the polyesters, it is preferred that those containing only two hydroxyl groups be used. Among such diols are included ethylene glycol, propylene glycol, butylene glycol, diethylene glycol, dipropylene glycol, triethylene glycol, tetraethylene glycol, butanediol-1,2, butanediol-1,3, butanediol-1,4, pentanediol-1,2, pentanediol-1,4, pentanediol-1,5, hexanediol-1,6, neopentyl glycol, 2,2,4-trimethyl-1,3-pentanediol and the like, as well as mixtures thereof. However, saturated aliphatic polyhydric alcohols containing more than two hydroxyl groups may also be employed. Among such polyols are included glycerol, trimethylol ethane, trimethylol propane, pentaerythritol, sorbitol and the like, as well as mixtures thereof. It is usually desirable that such polyols containing more than two hydroxyl groups be employed in minor proportions relative to the diol or diols used.

The unsaturated dicarboxylic acids or their anhydrides, dihydric alcohols and lignin or lignin derivatives may be reacted in the manner customarily used in the art for the preparation of ethylenically unsaturated polyester resins. The reaction is preferably carried out at elevated temperatures and at atmospheric pressure although pressures slightly above or below atmospheric pressure may be employed. The reaction temperature is not critical. The preferred reaction temperature will be a temperature just below the boiling point of the most volatile component of the reaction mixture. The most volatile component is typically the polyol. However, temperatures in excess of the boiling point of the most volatile constituent may be employed if the reaction vessel is equipped with a reflux condensor which permits water of esterification to escape from the reaction vessel while condensing volatilized reaction components and returning them to the site of the reaction.

From the modified unsaturated polyesters are prepared polyester resinous compositions by combining the modified unsaturated polyesters with a polymerizable, ethylenically unsaturated monomeric crosslinking agent containing a $CH_2\!\!=\!\!C$ group and preferably having a boiling point, at atmospheric pressure, of 60° C. or greater.

Among such polymerizable compounds are included styrene, side chain substituted styrenes, ring substituted styrenes, halostyrenes, alkyl esters of acrylic and methacrylic acid, aliphatic vinyl esters, acrylamide, methacrylamide, derivatives of acrylamide and methacrylamide, and allyl compounds. Among the side chain substituted styrenes are included alphamethyl styrene, alphaethyl styrene and the like. Among the ring substituted styrenes are included ortho-, para-, and meta-alkyl styrenes such as orthomethyl styrene, para-methyl styrene, para-ethyl styrene, meta-propyl styrene, 2,4-dimethyl styrene, 2,5-diethyl styrene and the like. Among the halostyrenes are included ortho-bromostyrene, para-chlorostyrene, 2,4-dichlorostyrene and the like. Among the alkyl esters of acrylic and methacrylic acid are included methyl acrylate, ethyl acrylate, butyl acrylate, methyl methacrylate and the like. Among the aliphatic vinyl esters are included vinyl acetate, vinyl butyrate, vinyl laurate, acrylonitrile, methacrylonitrile, vinyl chloride and the like. Among the allyl compounds are included diallyl phthalate, allyl acetate, allyl methacrylate, diallyl carbonate, allyl lactate, allyl alpha-hydroxyisobutyrate, allyl trichlorosilane, allyl acrylate, diallyl malonate, diallyl oxalate, diallyl gluconate, diallyl methyl gluconate, diallyl adipate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylenetetrahydrophthalic anhydride, triallyl tricarballylate, triallyltrimesate, triallyl aconitate, triallyl cyanurate, triallyl citrate, triallyl phosphate, trimethallyl phosphate, tetraallyl silane, tetraallyl silicate, hexallyldisiloxane and the like. These polymerizable, ethylenically unsaturated monomeric crosslinking agents may be used singly or in combination with one another.

The ratio of the unsaturated polyester to the monomeric crosslinking agent may be varied over a wide range and, therefore, this ratio is not critical. For example, the unsaturated reactive resin content may range from about 10 to about 90% of the total weight of this copolymerizable mixture. For most purposes, however, the polyester resinous compositions will comprise from about 30 to 60 parts of the unsaturated resin and correspondingly from about 70 to 40 parts of the polymerizable monomer.

In order to facilitate the copolymerization of the monomeric crosslinking agent with the reactive resin, it is preferred that a polymerization catalyst be incorporated in the composition at the time of its curing. The type and amounts of these catalytic materials which may be used are well known in the art, and any material which normally induces polymerization of polyester resinous compositions can be utilized. The optimum reaction conditions are modified to some extent by the choice of the particular catalyst used in the process. A very active catalyst should be used in lower concentrations, and preferably at lower temperatures, than a less reactive catalyst. The catalysts that are preferably employed comprise a wide variety of organic superoxides, i.e., organic peroxides ("acidic peroxides") and hydroperoxides ("alcoholic peroxides"). Mixtures of peroxides and hydroperoxides, including commercially available mixtures such as methyl ethyl ketone peroxide, cyclohexanone peroxide, and the like, are especially effective as catalysts. Among the organic peroxide catalysts that may be employed are acetyl peroxide, benzoyl peroxide, substituted benzoyl peroxides, and particularly halogenated benzoyl peroxides such as p-bromobenzoyl peroxide, 2,4-dichlorobenzoyl peroxide, etc., benzoyl acetyl peroxide, phthalyl peroxide, succinyl peroxide, fatty oil acid peroxides, such as coconut oil peroxide, lauryl peroxide, stearyl peroxide, oleyl peroxide, anisoyl peroxide, toluyl peroxide, and the like. Organic peracids, such as peracetic acid and perbenzoic acid, may also be employed. Among the organic hydroperoxide catalysts that may be employed are tertiary butyl hydroperoxide, cumene hydroperoxide, diisopropyl benzene hydroperoxide, 1-hydroxycyclohexyl hydroperoxide, the terpene oxides, such as ascaridole hydroperoxide, 1-p-menthane hydroperoxide, etc., and the like. Various other types of polymerization catalysts may also be employed, for example, compounds such as aluminum chloride, stannic chloride, boron trifluoride, or the azo-type catalysts such as alpha, alpha-azobisisobutyronitrile.

Since the polyester constituents of the resinous compositions mentioned above may contain a high degree of polymerizable unsaturation, it may be desirable to incorporate a polymerization inhibitor therewith. The inhibitor, which is a material whose primary function is to retard internal polymerization of the polyester constituent of the resinous composition, effects stabilization of the composition during any storage period encountered prior to curing. However, once the resinous composition is contacted with a sufficient amount of a polymerization catalyst, the effect of the inhibitor will be overcome. Among the inhibitors that may be used are phenol; the monoalkyl phenols, such as ortho-, meta-, and para-cresol as well as mixtures of such isomers; polyalkyl phenols having a plurality of the same or different substituents, e.g., ethyl, propyl, butyl, and higher alkyl radicals attached to their nuclei; catechol, tertiary butyl catechol, hydroquinone, tertiary butyl hydroquinone, resorcinol, eugenol, guaiacol, pyrogallol, benzaldehyde, tannic acid, ascorbic acid, isoascorbic acid, phenylene diamine, sym-di-$\beta$-naphthyl-p-phenylene diamine, aniline, and the like. The amount of polymerization inhibitor employed depends on the nature of the polyester resinous composition as well as the period of storage stability required. Generally, from about 0.001% to 0.3% by weight, based on the total weight of polymerizable reactive components present, will be sufficient.

Inhibitors of this type may be added to the reactive resin during the preparation thereof or optionally added later to the compound polyester resinous composition. In addition, other known additives may be employed such as promoters used in conjunction with the catalyst, mold lubricants, fillers and reinforcements, colorants, flow promoters, ultraviolet absorbing compounds, and the like.

The conditions necessary for curing the polyester resinous compositions of this invention do not depart from the practice ordinarily observed in curing this type of composition. They may be cured in contact with air or in enclosed molds at temperatures ranging from about 10° C. to about 160° C., or even higher as long as they are kept below the point at which the particular resinous composition employed begins to decompose. Where it is convenient, it is especially desirable to cure the resinous compositions by heating the catalyzed, resin-forming mass to between 90° C., and about 150° C. for a period of about 3 to 90 minutes.

The lignin moieties incorporated into the polyester backbone by the present invention are thermally stable at the polymer processing temperature and are nonextractable from the polymr which makes these colored unsaturated polyesters particularly suitable for use in bathroom fixtures such as sinks, showers and tubs, boats, certain automotive applications and the like. The addition of these lignin colorants during polymerization gives greater color uniformity than could be expected when colorants are blended in prior to casting or molding operations. These lignin colorants are less expensive when compared to other dyes and pigments and the lignin colorants provide a polyester having greater clarity than amber colored polyesters prepared using iron oxide as the colorant.

The following examples are given to further illustrate the invention, but it is understood that the invention is not to be limited in any way by the details described therein.

The following two examples will illustrate the preparation of lignin derivatives:

EXAMPLE 1

Lignin Acetate—A mixture of 100.0 g of lignin, 500 mL of acetic acid, 100 g of acetic anydride, and 0.5 g of sodium acetate is stirred at ambient temperature for 48 hours, poured into 2 liters of water, and the precipitated lignin acetate recovered by filtration. This lignin acetate (yield, approximately 108 g) is shown by analysis to contain 13.3% acetyl by weight.

EXAMPLE 2

(2-Hydroxyethoxy) Lignin—A solution of 100 g of lignin in 600 mL of water containing 40.0 g of sodium hydroxide is treated with 75.0 mL of ethylene oxide and stirred at 120° C. for 8 hours. The resulting reaction mixture is acidified and filtered to give 102 g of solid product. A sample of this (2-hydroxyethoxy) lignin is fully acetylated with acetic anhydride in pyridine and analyzed by $^1$H NMR spectroscopy and acetyl analysis. The sample contains 14.1% acetyl, all of which is aliphatic according to the NMR analysis.

The remaining two examples illustrate the preparation of colored polyester resins.

EXAMPLE 3

Preparation of Polyester Unsaturated Resin of Neopentyl Glycol, Isophthalic Acid, and Maleic Anhydride Copolymerized with Lignin and Crosslinked with Styrene—A one-liter flask is fitted with a stirrer, thermometer, nitorgen inlet tube, and a heated Vigreux column. The top of the Vigreux column is also fitted with a Dean-Stark trap and cold water condenser. The flask is charged with 251.6 g of neopentyl glycol (2.415 moles), 191.0 g of isophthalic acid (1.15 moles), 3.0 g lignin, and 0.55 g of dibutyl tin oxide. The monomers are reacted at 185° to 195° C. until the theoretical amount of distillate is collected. The reaction is cooled to 145° C. and 112.8 g of maleic anhydride (1.15 moles) and 0.055 g of toluhydroquinone are added. The reaction is continued for one hour at 175° C., one hour at 185° C. and at 195° C. until the acid number of the unsaturated polyester is 18.2. The inherent viscosity of the polyester is 0.136 and the number average molecular weight is 2660. The unsaturated polyester is amber colored. The unsaturated polyester is dissolved in 40 weight percent styrene monomer and combined with 1 weight percent benzoyl peroxide. One-eighth inch thick castings are prepared by decanting the resin between glass plates separated by ⅛ in. thick spacers and sealed around three sides with a ⅛ in. thick gasket. The resin is cured by heating for two hours at 70° C., one hour at 100° C., two hours at 125° C., and one hour at 150° C. After cooling, the thermoset polyester sheet is removed and cut into bars. The flexural strength of the thermoset polyester is $18.50 \times 10^3$ psi.

EXAMPLE 4

Preparation of a Polyester Unsaturated Resin of Propylene Glycol, Isophthalic Acid, and Maleic Anhydride Copolymerized with Lignin Acetate and Crosslinked with Styrene—The below compounds are charged in to the equipment described in Example 3.

192.5 g propylene glycol (2.53 moles)
191.0 g isophthalic acid (1.15 moles)
0.50 g dibutyl tin oxide
2.6 g lignin acetate The compounds are reacted at 185° to 195° C. until the theoretical amount of distillate is collected. The reaction is cooled to 145° C. and 112.8 g maleic anhydride (1.15 moles) and 0.05 g of toluhydroquinone are added. The reaction is continued for one hour at 175° C., one hour at 185° C., and at 195° C. until the acid number of the unsaturated resin is 14.3. The inherent viscosity of the polyester is 0.14 and the number average molecular weight is 1920. The unsaturated polyester is amber colored. The unsaturated polyester is dissolved in 40 weight percent styrene monomer and combined with 1 weight percent benzoyl peroxide. One-eighth inch thick castings are prepared by decanting the resin between glass plates separated by ⅛ in. thick spacers and sealed around three sides with a ⅛ in. thick gasket. The resin is cured by heating for two hours at 70° C., one hour at 100° C., two hours at 125° C., and one hour at 150° C. After cooling, the thermoset polyester sheet is removed and cut into bars. The flexural strength of the thermoset polyester is $18.64 \times 10^3$ psi.

I.V. (inherent viscosity) is measured at 25° C. using 0.5 grams of polymer per 100 mL of a solvent consisting of 60% by weight phenol and 40% by weight tetrachloroethane.

Flexural strength is measured according to ASTM D-790.

Acid number is defined as the number of mg. of KOH required to neutralize the free acids in 1 g. of material.

This invention has been described in detail with particular reference to preferred embodiment thereof, but it will be understood that many variations and modifications can be effected within the spirit and scope of the invention.

It is claimed:

1. A crosslinked colored polyester comprising:
   an unsaturated polyester having chemically linked into the polyester backbone a color-imparting amount of a compound selected from lignin and a lignin compound having functional groups chemically linkable with said polyester backbone, and
   a polymerizable ethylenically unsaturated crosslinking agent crosslinked with said unsaturated polyester in an amount such that the ratio of unsaturated polyester to crosslinking agent is greater than 0.1 and less than 9.0.

2. A composition as claimed in claim 1 wherein said unsaturated polyester comprises:
   an acid moiety selected from the group consisting of unsaturated polycarboxylic acids and anhydrides of unsaturated polycarboxylic acids, and
   at least one polyhydric alcohol present in an amount sufficient to polymerize with said acid moiety.

3. A composition as claimed in claim 2 wherein said acid moiety furhter comprises at least one noncrosslinkable polycarboxylic acid which constitutes up to 80 percent of the total equivalents of carboxyl groups present in the acid moiety.

4. A composition as claimed in claim 3 wherein said noncrosslinkable polycarboxylic acid constitutes between 35 and 75 percent of the total equivalents of carboxyl groups present in the acid moiety.

5. A composition as claimed in claim 2 wherein said unsaturated polycarboxylic acid is selected from the group consisting of alpha, beta-ethylenically unsaturated polycarboxylic acids having 2 to 12 carbon atoms.

6. A composition as claimed in claim 5 wherein said alpha beta-ethylenically unsaturated polycarboxylic acid is selected from the group consisting of maleic acid, fumaric acid, substituted fumaric acid, citraconic acid, mesaconic acid, tetraconic acid, glutaconic acid, and muconic acid.

7. A composition as claimed in claim 2 wherein said polyhydric alcohol is selected from the group consisting of saturated aliphatic polyhydric alcohols containing at least two hydroxyl groups.

8. A composition as claimed in claim 7 wherein said polyhydric alcohol is selected from the group consisting of ethylene glycol, propylene glycol, butylene glycol, diethylene glycol, dipropylene glycol, triethylene glycol, tetraethylene glycol, 1,3-butanediol, 1,3-butanediol, 1,4-butanediol, 1,2-pentanediol, 1,4-pentanediol, 1,5-pentanediol, 1,6-hexanediol, neopentyl glycol, 2,2,4-trimethyl-1,3-pentanediol, glycerol, trimethylol ethane, trimethylol propane, pentaerythritol, and sorbitol.

9. A composition as claimed in claim 4 wherein said noncrosslinkable polycarboxylic acid is selected from the group consisting of oxalic acid, malonic acid, succinic acid, glutaric acid, sebacic acid, adipic acid, phthalic acid, isophthalic acid, terephthalic acid, tetrachlorophthalic acid, suberic acid, azelaic acid, tricarballylic acid, citric acid, tartaric acid, cyclopropanedicarboxylic acid, and cyclohexanedicarboxylic acid.

10. A composition as claimed in claim 1 wherein said crosslinking agent is selected from the group consisting of styrene, side chain substituted styrenes, ring substituted styrenes, alkyl esters of acrylic acid, alkyl esters of methacrylic acid, aliphatic vinyl esters, acrylamide, methacrylamide. acrylamide compounds, methacrylamide compounds, and allyl compounds.

11. A composition as claimed in claim 10 wherein said side chain substituted styrene is selected from alpha-methyl styrene and alpha-ethyl styrene;
   said ring substituted styrene is selected from alkyl styrenes and halostyrenes,
   said alkyl ester of acrylic acid is selected from methyl acrylate, ethyl acrylate and butyl acrylate,
   said alkyl ester of methacrylic acid is selected from' methyl methacrylate, ethyl methacrylate and butyl methacrylate, said aliphatic vinyl ester is selected from vinyl acetate, vinyl butyrate, vinyl laurate, acrylonitrile, methacrylonitrile and vinyl chloride, and said allyl compound is selected from diallyl phthalate, allyl acetate, allyl methacrylate, diallyl carbonate, allyl lactate, allyl alpha-hydroxyisobutyrate, allyl trichlorosilane, allyl acrylate, diallyl malonate, diallyl oxalate, diallyl gluconate, diallyl methyl gluconate, diallyl adipate, diallyl sebacate, diallyl tartronate, diallyl tartrate, diallyl mesaconate, diallyl citraconate, diallyl ester of muconic acid, diallyl itaconate, diallyl chlorophthalate, diallyl dichlorosilane, diallyl ester of endomethylenetetrahydrophthalic anhydride, triallyl tricarballylate, triallyltrimesate, triallyl aconate, triallyl cyanurate, triallyl citrate, triallyl phosphate, trimethallyl phosphate, tetraallyl silane, tetraallyl silicate and hexallyldisiloxane.

12. A composition as claimed in claim 11 wherein said alkyl styrene is selected from ortho-methyl styrene, para-methyl styrene, para-ethyl styrene, meta-propyl styrene, 2,4-dimethyl styrene and 2,5-diethyl styrene, and said halostyrenes comprise ortho-bromostyrene, para-chlorostyrene and 2,4-dichlorostyrene 13. A composition as claimed in claim 1 wherein the ratio of said unsaturated polyester to said crosslinking agent is in the range of 0.4 to 1.5.

14. A composition as claimed in claim 1 wherein said lignin compound is selected from lignin esters, lignin ethers, carboxy lignins and oxy lignins.

15. A composition as claimed in claim 1 wherein said lignin compound is selected from lignin acetate, lignin propionate, lignin butyrate, lignin ethyl ether, lignin methyl ether, carboxymethyl lignin, (hydroxyethoxy) lignins, and (hydroxypropoxy) lignins.

16. A composition as claimed in claim 1 wherein said unsaturated polyester further comprises a sufficient amount of a polymerization inhibitor to retard internal polymerization of said unsaturated polyester.

17. A composition as claimed in claim 16 wherein the amount of said polymerization inhibitor comprises between 0.001 and 0.3 weight percent of said unsaturated polyester.

18. A composition as claimed in claim 17 wherein said polymerization inhibitor is selected from phenol, monoalkyl phenols, polyalkyl phenols, catechol, tertiary butyl catechol, hydroquinone, tertiary butyl hydroquinone, resorcinol, eugenol, guaiacol, pyrogallol, benzaldehyde, tannic acid, ascorbic acid, isoascorbic acid, phenylene diamine, sym-di-beta-naphthylp-phenyllene diamine and aniline.

19. A composition as claimed in claim 18 wherein said monoalkyl phenol is selected from ortho-cresol, meta-cresol, and para-cresol.

20. A composition as claimed in claim 1 further comprising an effective amount of an ultraviolet absorbing compound.

21. A process for preparing a colored polyester having an inherent viscosity of about 0.1 to about 0.3 comprising the steps of:
polymerizing at least one alcohol with at least one compound selected from unsaturated polycarboxylic acids and anhydrides of unsaturated polycarboxylic acids, and with a color-imparting amount of a compound selected from lignin and lignin compounds which can be chemically linked in a polyester backbone.

22. A process as claimed in claim 21 wherein said reaction is carried out at a pressure substantially the same as atmospheric pressure.

23. A process as claimed in claim 22 wherein said reaction is carried out at a temperature which is less than the boiling point of the most volatile constituent of the reaction mixture.

24. A process as claimed in claim 21 further comprising the step of:
adding a sufficient amount of a polymerization inhibitor to the reaction mixture during the reaction to retard internal polymerization of said unsaturated polyester.

25. A process as claimed in claim 24 wherein said amount of polymerization inhibitor comprises 0.001 to 0.3 weight percent of said colored unsaturated polyester.

26. A process as claimed in claim 21 further comprising the step of:
crosslinking said colored polyester resin with an amount of a polymerizable, ethylenically unsaturated crosslinking agent sufficient to constitute between 10 and 90 weight percent of said colored polyester resin.

27. A process as claimed in claim 21 further comprising the step of adding an effective amount of a polymerization catalyst which induces polymerization of polyester resinous compositions.

28. An article of manufacture comprising a composition as claimed in claim 1.

29. A colored unsaturated polyester comprising an acid moiety selected from the group consisting of unsaturated polycarboxylic acids and anhydrides of unsaturated polycarboxylic acids,
at least one polyhydric alcohol present in an amount sufficient to polymerize with said acid moiety, and
a color-imparting amount of a compound selected from lignin and lignin derivatives which are chemically linkable into a polyester backbone, said compound being chemically linked into the polyester backbone.

* * * * *